(12) United States Patent
Brooks et al.

(10) Patent No.: US 6,406,062 B1
(45) Date of Patent: Jun. 18, 2002

(54) HIDDEN IMAGE GAME PIECE

(75) Inventors: Joel M. Brooks, Conyers; Donnie Causey, Cumming; Matthew Montesi, Dunwoody, all of GA (US)

(73) Assignee: Global Commerce Group, LLC, Atlanta, GA (US)

( * ) Notice: Subject to any disclaimer, the term of this patent is extended or adjusted under 35 U.S.C. 154(b) by 0 days.

(21) Appl. No.: 09/634,111

(22) Filed: Aug. 8, 2000

Related U.S. Application Data

(63) Continuation-in-part of application No. 09/437,254, filed on Nov. 10, 1999, now Pat. No. 6,296,900, which is a continuation of application No. 09/081,795, filed on May 20, 1998, now Pat. No. 5,984,367.

(60) Provisional application No. 60/148,226, filed on Aug. 9, 1999.

(51) Int. Cl.⁷ .................................................. B44F 1/10
(52) U.S. Cl. ............................ 283/92; 283/94; 283/95; 283/114; 427/145; 427/261; 427/265; 427/282; 427/258; 427/259; 427/402; 428/213; 428/215; 428/216; 273/138.1; 273/138.2; 273/139; 273/269; 273/272
(58) Field of Search ......................... 283/92, 94, 95, 283/114; 427/145, 261, 265, 282, 402, 258, 259; 428/213, 215, 216; 273/138.1, 138.2, 139, 269, 272

(56) References Cited

U.S. PATENT DOCUMENTS

| | | | | |
|---|---|---|---|---|
| 3,617,324 A | * | 11/1971 | Thomas ........................ | 117/1.7 |
| 3,784,394 A | * | 1/1974 | Bildulsas et al. ............. | 117/1.7 |
| 4,360,548 A | * | 11/1982 | Skees et al. ............. | 428/320.8 |
| 5,055,345 A | * | 10/1991 | Wank et al. ................. | 428/215 |
| 5,076,613 A | * | 12/1991 | Kovacs .......................... | 283/94 |
| 5,150,595 A | * | 9/1992 | Filo .............................. | 283/95 |
| 5,206,520 A | * | 4/1993 | Filo ............................ | 273/139 |
| 5,311,017 A | * | 5/1994 | Filo ............................ | 235/482 |
| 5,334,836 A | * | 8/1994 | Filo ............................ | 235/482 |
| 5,401,032 A | * | 3/1995 | Barnhart et al. ............. | 273/293 |
| 5,769,458 A | * | 6/1998 | Carides et al. ................ | 283/94 |
| 5,863,075 A | * | 1/1999 | Rich et al. ..................... | 283/94 |
| 5,957,458 A | * | 9/1999 | Haas et al. ................. | 273/269 |
| 5,984,367 A | * | 11/1999 | Barnhart et al. .............. | 283/92 |
| 6,296,900 B1 | * | 10/2001 | Barnhart et al. ............. | 427/145 |

* cited by examiner

Primary Examiner—A. L. Wellington
Assistant Examiner—Mark T. Henderson
(74) Attorney, Agent, or Firm—Sanford J. Asman

(57) ABSTRACT

A hidden image game piece and a method by which a hidden image game piece is produced and used. A first hidden image game piece is formed on a transparent or translucent substrate. A second hidden image game piece is formed electronically, and optionally printed or, alternatively, saved and distributed in electronic format. The hidden image game piece can be used to distributed either physically or electronically, and it may be used to derive demographic information from recipients, to drive them to web sites or retail outlets, and to provide a means for distributing advertising, either on the game pieces or at a game site, which may be a physical site, such as a retail outlet, or an electronic site, such as an Internet site. The methods of the present invention include the method of producing a game piece, the method of deriving demographic information from recipients of the game pieces, and the method of providing advertising to recipients of the game pieces.

23 Claims, 14 Drawing Sheets

FIG. 5

38 — Process Print Colored Ink Dots On Transparent Or Translucent Substrate, Forming Image Which Is To Be Concealed.

40 — Process Print The Concealing Image(s) Over The Image To Be Concealed.

42 — Apply Overall Dull Varnish/ Aqueous Coating.

44 — Allow Printed Sheet To Cure.

FIG. 7
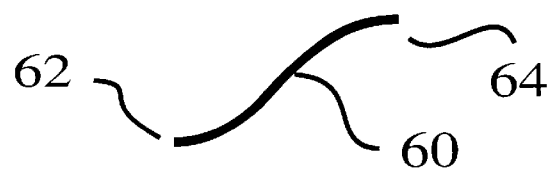
FIG. 8
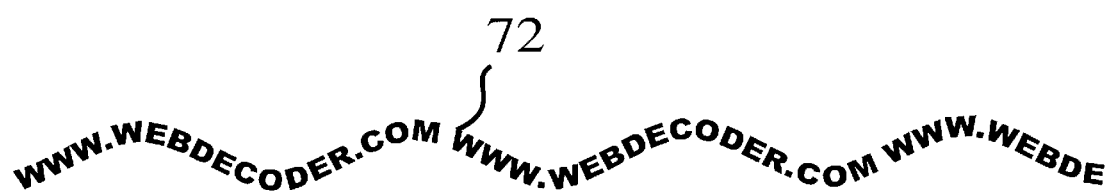
FIG. 9

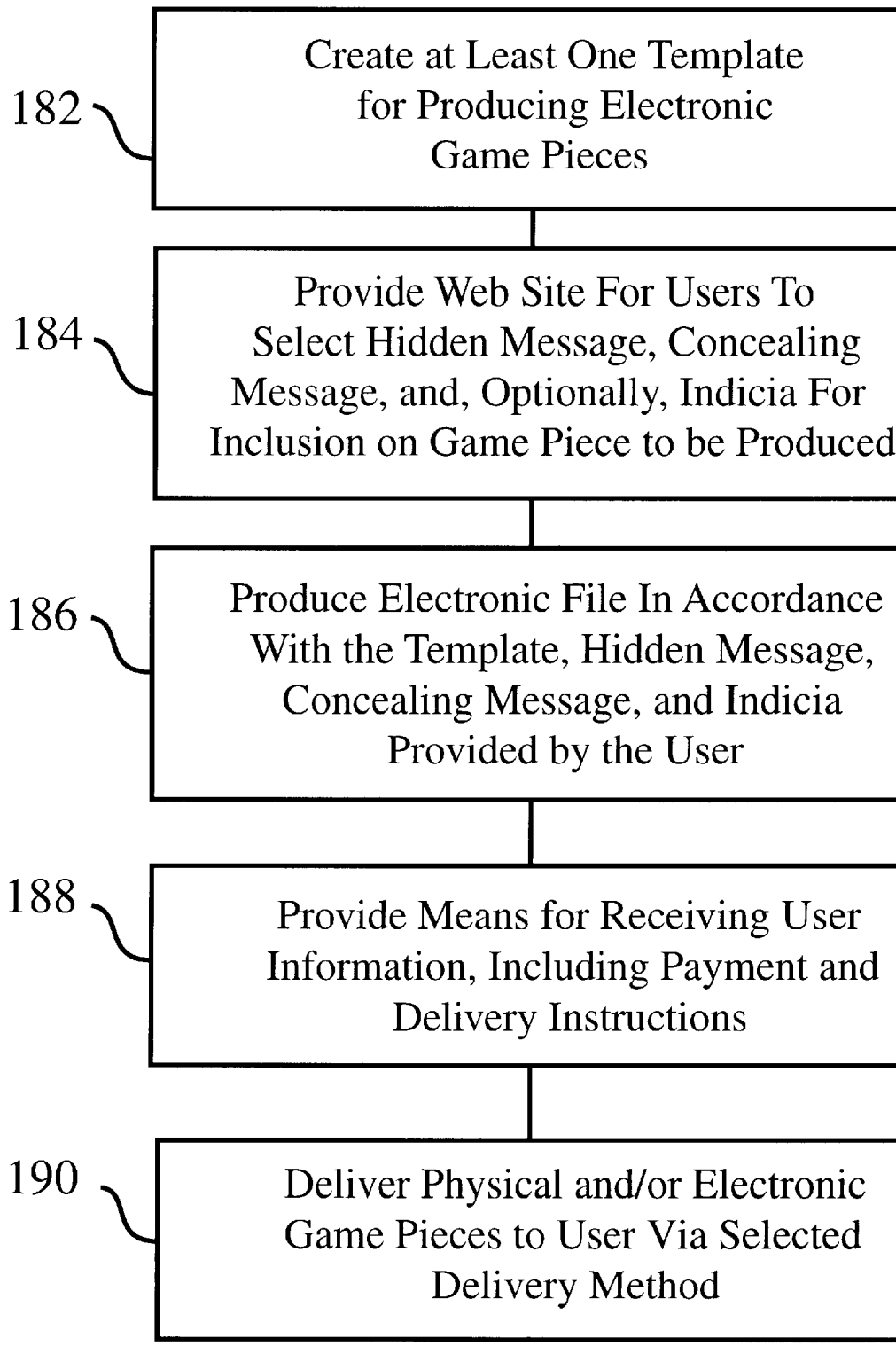

HIDDEN IMAGE GAME PIECE

CROSS-REFERENCE TO RELATED APPLICATIONS

The present application is a continuation-in-part of U.S. patent application Ser. No. 09/437,254, filed Nov. 10, 1999, now U.S. Pat. No. 6,296,900, issued Oct. 2, 2001, entitled HIDDEN IMAGE GAME PIECE, filed Nov. 10, 1999, which is a continuation of U.S. Pat. Application Ser. No. 09/081,795, filed May 20, 1998, now U.S. Pat. No. 5,984,367, issued Nov. 16, 1999, entitled HIDDEN IMAGE GAME PIECE. It is also a continuing prosecution application of provisional application Ser. No. 60/148,226, filed Aug. 9, 1999 entitled ORIGINAL NET DECODER. The present application further claims priority from PCT application Ser. No. PCT/US99/26464, filed Nov. 10, 1999.

BACKGROUND OF THE INVENTION

1. Field of the Invention

The present invention relates to game pieces. In particular, the present invention relates to game pieces which reveal concealed information when exposed to an additive light source.

2. Description of the Related Art

In numerous types of situations and environments it is desirable or necessary to provide a substrate which carries a hidden image. That hidden image might be a word, number, icon, logo, drawing, picture, depiction, marking, message, pattern, or some other indicia. For example, when a sheet with a hidden image is used as a game piece, its hidden image, once revealed, may be used to:

(a) communicate the name of a particular prize in a sweepstakes;

(b) communicate a particular number which has to be matched identically to a predetermined "winning" number in order to win a prize;

(c) communicate a particular word which has to be matched identically to a predetermined "winning" word in order to win a prize; or (d) communicate a particular image, picture, logo, or icon in order to win a prize.

Often, there is a predetermined "seeding" structure inherent in a game-piece-delivered sweepstakes in which only a certain predetermined number of "winning" game pieces are printed and distributed for each corresponding prize level. However, because the game piece's potentially "winning" information is hidden, no contest participant has a chance to win unless he or she interacts with a game piece to reveal its concealed image.

There are numerous ways to create a substrate which carries a hidden image. All of these techniques could theoretically be used to create a game piece with a hidden image. For example, in some merchandising schemes a hidden image is present on a substrate, and it can be read only after a coating is removed, such as by scratching the coating or otherwise removing all, or portions of, the coating. Some types of hidden images on a substrate appear only after a chemical solution is applied to the substrate. Some types of hidden images which are carried by a substrate appear only after a reaction occurs in the image when the substrate is subjected to artificial or natural light. Some types of hidden images which are carried by a substrate are made to appear only after the substrate is subjected to a significant temperature change. Some types of hidden images which are carried by a substrate are made visible only when observed by special types of light. Some types of hidden images which are carried upon a substrate are made visible for reading only when viewed through special optics. Several other methods for applying and reading hidden images have also been created.

Devices have been created in which a hidden image carried on a substrate only becomes visible when exposed to specific color(s) of light in the visible spectrum. Typically, such devices are created by using printing, or some other technique, to apply images to the substrate. For example, the image which is to be hidden may be applied to the substrate using one color. Then the marking, pattern, or image which has been designed to conceal the hidden image may be applied to the same portion of the substrate as the hidden image, using a different color. Generally, the concealing marking, pattern, or image is designed to cover, surround, or otherwise camouflage the concealed image in a way that makes the concealed image imperceptible in normal light. Often, a "mezzotint" pattern is used for the concealing marking, pattern, or image ("mezzotint" refers to a computer-generated pattern which has red and yellow elements; such a pattern is often used to disguise an image printed in light blue). An image which has been hidden in this manner may be revealed by exposing the substrate to light of a color similar to the concealing marking, pattern, or image.

All of the previously known methods for creating a light-activated hidden image game piece have proved to be unsuitable for creating a hidden image game piece which is capable of being activated by the low-intensity light emanated by a typical computer monitor screen. In the past, light-activated hidden image game pieces have typically: (1) employed a paper substrate; (2) not required that the density of the inks applied to the substrate be limited to a specific range; and (3) used a color filtering device to provide the specific color of light required to activate the game piece.

A number of game pieces have been created in which a previously hidden image will be revealed when the game piece is viewed through a color filtering device. As used herein, the term "color filtering device" refers to a device which tends to prevent the transmission of light rays of a substantially different color than the color filtering device. For example, if the primary color red is used for the color filtering device, it will absorb light of the other primary colors, namely blue and green, while passing red light. Accordingly, objects which are otherwise blue or green will appear black (in the absence of light transmission); red objects will remain red; white objects will also be seen as red, as the blue and green components of the white light will be absorbed by the color filtering device. Accordingly, on a white background, a blue image may be surrounded and camouflaged by red markings so as to appear substantially illegible when viewed with the naked eye. When viewed through a red filter, however, the image can be seen as a black image on a solid red background. U.S. Pat. No. 5,312,656 entitled TOY PICNIC SET HAVING A LATENT IMAGE PLACEMAT which issued on May 17, 1994 to J. Michaels shows the use of red filter (specifically, a transparent red plate in a toy picnic set) to reveal a hidden image in this way. A similar use of a red filter to reveal a hidden image is described in U.S. Pat. No. 5,401,032 entitled MYSTERY PUZZLE GAME which issued on Mar. 28, 1995 to T. L. Barnhart, et al.

An approach other than the color-filtering technique described above is required when designing a hidden-image game piece capable of being activated by a device such as a computer monitor. While a color filter uses ambient natural or artificial light, and screens out those colors of light which are undesired, it is also possible to "add" light of a specific color to a game piece, without filtering the ambient light. In the case of a computer monitor, or similar device, the "additive" light needed for activation of the game piece may be obtained by placing the game piece on a specifically-colored area of the screen of an operating monitor, or a device which otherwise gives off colored light of the correct frequency. This action floods the game piece with the specific type of colored light required for activation, thereby revealing the hidden image.

By way of example, it is possible to make a paper game piece which is designed to be activated by red light when placed on a television screen. In such a game piece, a printed red and yellow mezzotint pattern could be used to conceal a hidden image printed in light blue. When such a game piece is flooded with the additive red light supplied by a red square projected on the television screen from the source of transmission, the game piece's hidden message will be seen as a black image on a red background.

However, a paper game piece designed to be activated by a relatively high-intensity light source, such as a television screen, cannot be used with a relatively low-intensity light source, such as a computer monitor. The intensity of the additive light provided by a computer monitor is generally only 80–120 candlepower (the intensity of light a source is measured in standard units known as "candlepower", wherein one candlepower is equal to the light emitted by one standardized candle). A computer monitor's low-intensity light cannot activate a hidden-image paper game piece, because it cannot overcome the paper's opacity to reveal the hidden image. Therefore, a traditional paper substrate cannot be used to create an additive-light game piece designed to be activated by a computer monitor.

In the past, the density of the ink application used in printing an additive-light activated hidden image game piece has been of relatively minor importance. However, when producing an additive-light activated hidden image game piece which is designed for use with computer monitors, or other devices which emanate relatively low levels of additive light, the density of the ink application must be controlled within a narrow range. If the density is too high, it will serve to block the additive light needed to reveal the hidden image. If the density is too low, the hidden image and/or the concealing image will be illegible.

In the printing industry, "density" is a term of art. It refers to the thickness of a coating (typically, ink) which is applied to a substrate. One unit of density equals $1/100,000$ of an inch (0.00001 inch) of coating thickness. Therefore, a density of 100 equals $1/1000$ of an inch (0.001 inch) of coating thickness, which is equal to one mil. Printers typically use a tool known as a "densitometer" to measure coating thickness.

The phrase "dull coating" is also a term of art in the printing industry. It is often used interchangeably with the terms "dull varnish" or "frost coating". A dull coating is a coating which is traditionally used by printers to enhance the appearance and durability of printed matter. Such a coating may be oil-based or water-based. A water-based dull coating is commonly referred to as an "aqueous" coating.

In the past, there has not been any method of providing an electronic hidden image game piece of the type described, and such game pieces were always produced on a substrate, such as a paper or plastic substrate. Accordingly, it would be desirable to have a method for producing "electronic game pieces" which could be displayed on computer monitors, or served from Internet web sites.

SUMMARY OF THE INVENTION

The present invention is a game piece with a hidden image, and a method for producing such a game piece. To create the first embodiment of the game piece of the present invention, a first pattern of colored ink is deposited on a transparent or highly translucent substrate at a density which is preferably in the range of about 110–180 density in order to form an image. Then, a second pattern of colored ink, having a different color than the first pattern's ink, is deposited upon the substrate at a density which is preferably in the range of from about 90–170 density. The second pattern should cover at least a portion of the first pattern. When the game piece is flooded with additive light of the same color as the second pattern's ink, the previously concealed image, composed of the first pattern's ink, becomes perceptible. As a transparent, or highly translucent, substrate is preferably used for the game piece, and because the density of the ink application is controlled within certain ranges, the game piece thus created may be used with a low intensity additive light source, such as a computer monitor, or other, similar source of low-intensity additive light.

Among the advantages of the present invention are that it provides an additive-light activated hidden image game piece which will reveal its hidden image when exposed to relatively low levels of additive light, such as those typically emanated by a computer monitor. It provides a method for producing an additive-light activated hidden image game piece which will reveal its hidden image when exposed to relatively low levels of additive light, such as those typically emanated by a computer monitor. Also, it provides method for producing an additive-light activated hidden image game piece which creates high quality products.

In accordance with the foregoing embodiment of the present invention, each individual game piece may contain an a hidden image. The number of such images is, of course, determined during the printing step. Thus, if it is desired to have n different game pieces for distribution, it is necessary to print n different patterns on the game pieces. As will be obvious, the recipient of a particular game piece can decode that game piece by placing it over an additive light source of the correct frequency, but the image will always remain the same. For some applications it may be desirable to provide the ability to generate different hidden images without the need to distribute additional game pieces, something which cannot be done with the first embodiment of the invention.

In accordance with another embodiment of the present invention, a computer monitor, or similar device, can be used to generate a pattern which includes a hidden image. A game piece can be distributed which is a filter, allowing a single color of light to pass therethrough. Thus, if the image displayed on the computer monitor includes a hidden image having a color corresponding to the color of the filter (i.e., the color of the game piece), surrounded (or overlaid) by an obscuring pattern in other colors, the hidden image will pass through the game piece, while other areas will appear black.

In accordance with another embodiment of the invention, an electronic game piece is provided which can be displayed on computer monitors, or served from Internet web sites. This electronic game piece can be the basis of several businesses including traditional advertising to drive users to a physical or electronic location, or even the business of creating electronic game pieces to be served from a web site or physically or electronically produced for distribution.

BRIEF DESCRIPTION OF THE DRAWING

In the Drawing:

FIG. 5 is a block diagram illustrating the method of manufacturing the first embodiment of the present invention;

FIGS. 7–13 are plan views illustrating the method of the present invention which is used to produce the game piece of FIG. 6;

FIG. 20 is a flowchart illustrating another inventive business made possible by the game piece of the present invention.

DETAILED DESCRIPTION OF THE EXEMPLARY EMBODIMENTS

Figure 1:
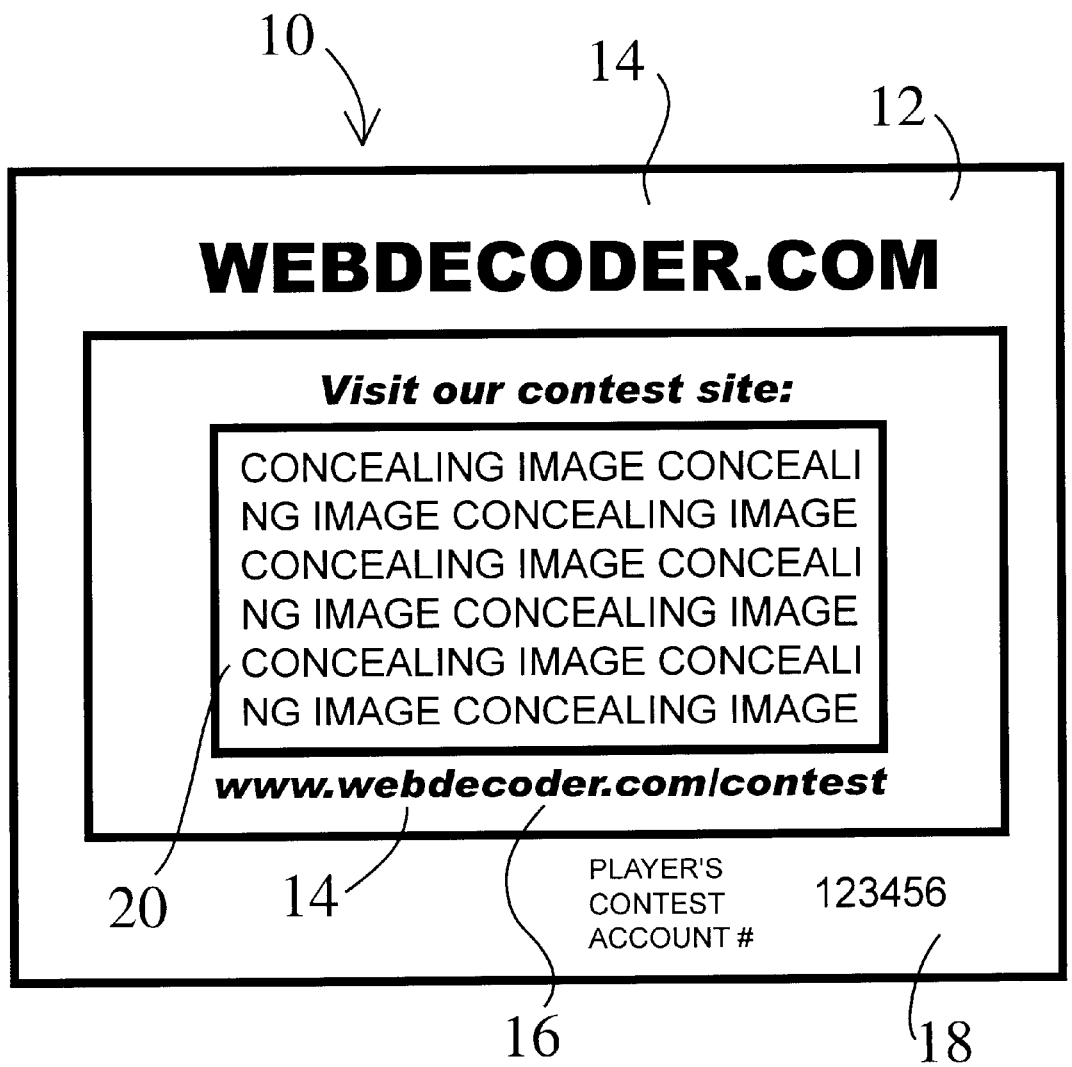
FIG. 1 is a plan view of a substrate on which a hidden image has been applied in accordance with the first embodiment of the invention, with the hidden image shown concealed.

Referring to FIG. 1, a first embodiment of the hidden image game piece 10, of the present invention, is shown. In the first embodiment, the game piece 10 is comprised of a substrate 12, which may be transparent or translucent. In the preferred embodiment, a transparent substrate is employed, although the game piece 10 can be made using a translucent substrate, with the opacity of the substrate 12 dependent upon the intensity of the light available from the light source used. Thus, if a very bright light source is used, the substrate 12 can be less transparent, while if a low level light source is used, the substrate should be more transparent. It has been found that good results may be may be obtained by using a transparent polyester substrate having a thickness of about 4 mil, or greater (a "mil" is 1/1000 of an inch). While a typical game piece 10 is formed on a rectangular, transparent piece of polyester, a suitable substrate can comprise a transparent or highly translucent compact disc (CD) which could be turned into a game piece in accordance with the present invention by using the techniques described herein.

If a transparent or translucent CD is used as a substrate, it should be noted that only discs which are not highly aluminized (e.g., discs which have not been aluminized or which have been only partially aluminized) are the most suitable for use as a game piece in accordance with the first embodiment of the present invention.

As shown in FIG. 1, the game piece 10 may include visible indicia 14 such as a company name or logo, the Uniform Resource Locator ("URL" or "web site address") 16 of an Internet site, and/or a serial number 18, which can be applied for security reasons. The game piece 10 further includes a concealing image 20 which is used to obfuscate a concealed image, as will be described hereinafter.

Figure 2:
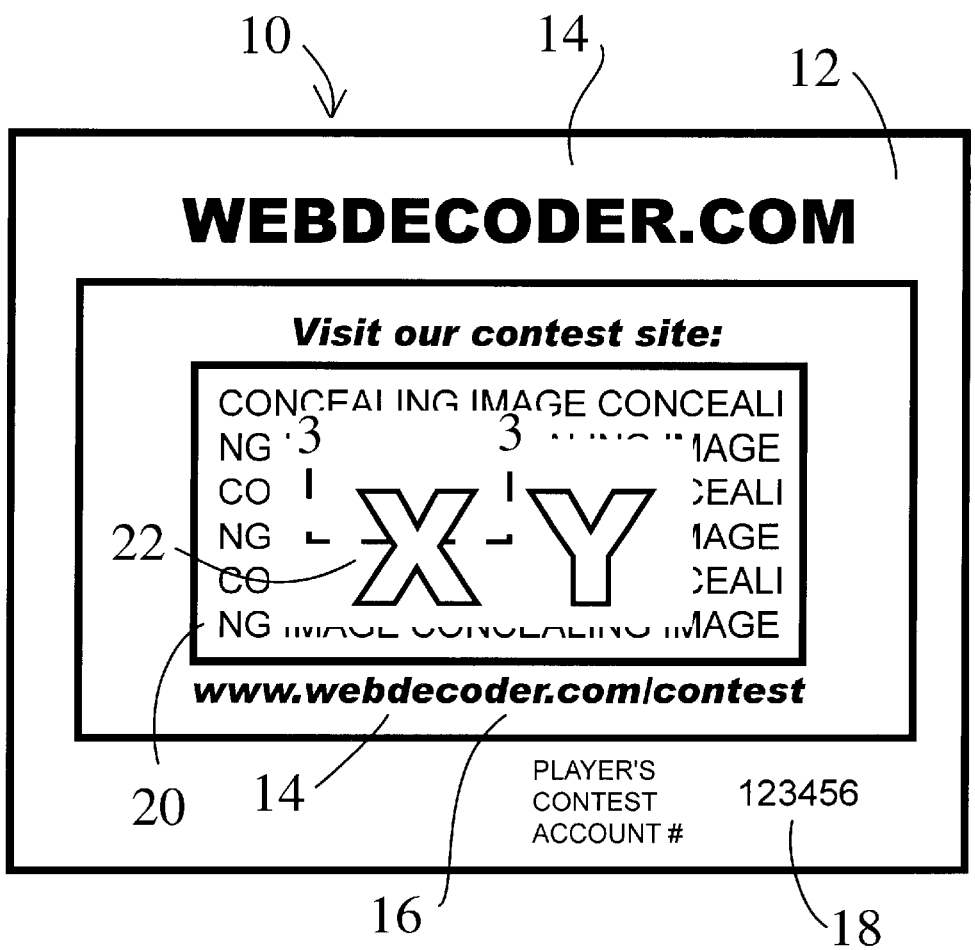
FIG. 2 is a plan view of the substrate of FIG. 1, on which a hidden image has been applied in accordance with the first embodiment of the invention, with the hidden image shown revealed.

Referring to FIG. 2, a concealed image 22 is applied to the surface of the substrate 12 by printing the concealed image 22 using a coating material, such as ink. In the preferred embodiment of the invention, the concealed image 22 is applied in high density fluorescent yellow ink at 120–140 density. A concealing image 20 is applied to the substrate 12 over the concealed image 22 by printing the concealing image 20 in a coating material, such as ink, after the concealed image 22 has been printed. In the preferred embodiment shown in FIGS. 1 and 2, the concealing image 20 is applied in high density fluorescent process cyan ink at 140–150 density. These elements have been combined to form an exemplary game piece 10.

Figure 3:
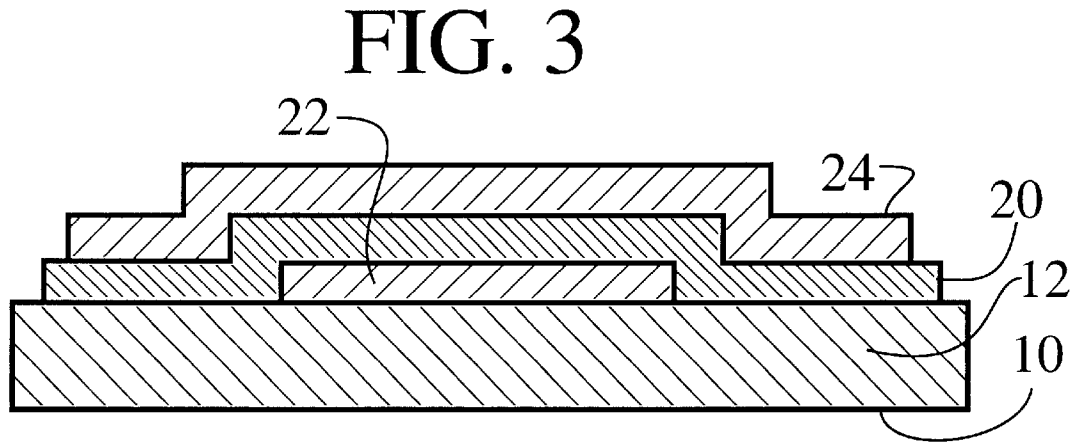
FIG. 3 is a section view of the substrate shown in FIG. 2, taken along the lines 3—3 of FIG. 2 showing the manner of manufacturing a game piece in accordance with a first embodiment of the invention.

With continued reference to FIG. 2, the lines 3—3 are used to represent the cross-section, through a portion of the substrate 12, the concealed image 22, and the concealing image 20, as shown in FIG. 3. With reference to FIG. 3 a cross-sectional view of the printed game piece 10 taken along the lines 3—3 of FIG. 2 is shown. Thus, FIG. 3 shows the transparent or translucent substrate 12 with the concealed image 22 printed thereon, and the concealing image 20 printed over the concealed image 22. FIG. 3 also shows the "dull" coating 24, applied over the tops of the printed images 20, 22, and preferably over the entire substrate 12. Although it the game piece 10 can be manufactured without applying the dull coating 24, far better results are generally obtained if the dull coating 24 is used. As recognized by those skilled in the printing arts, the dull coating 24 enhances the game piece 10 by preventing the underlying printed images 20, 22 from smudging. The dull coating 24 also gives the printed game piece 10 a "finished" appearance. Another benefit derived from the dull coating 24 is that it substantially reduces the reflectivity of the substrate 12, thereby reducing the contrast between the substrate 12 and the printed images 20, 22. Thus, the application of the dull coating 24 to the game piece 10 makes it virtually impossible to detect the concealed image 22 without additive-light activation.

Figure 4:
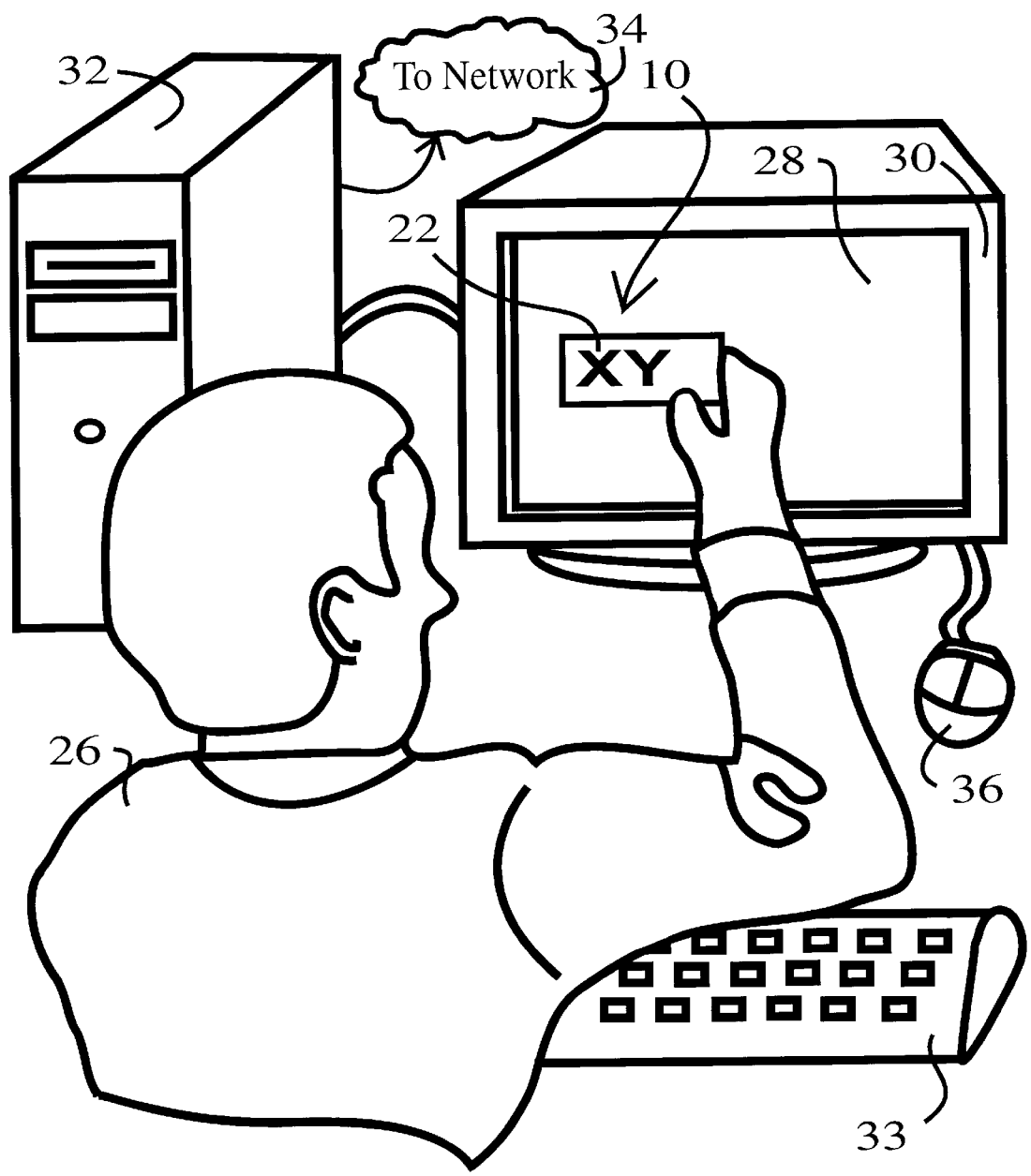
FIG. 4 is a plan view showing a hidden image game piece in accordance with the first embodiment of the invention being held up to a computer monitor to demonstrate the manner of revealing a hidden image.
Figure 6:
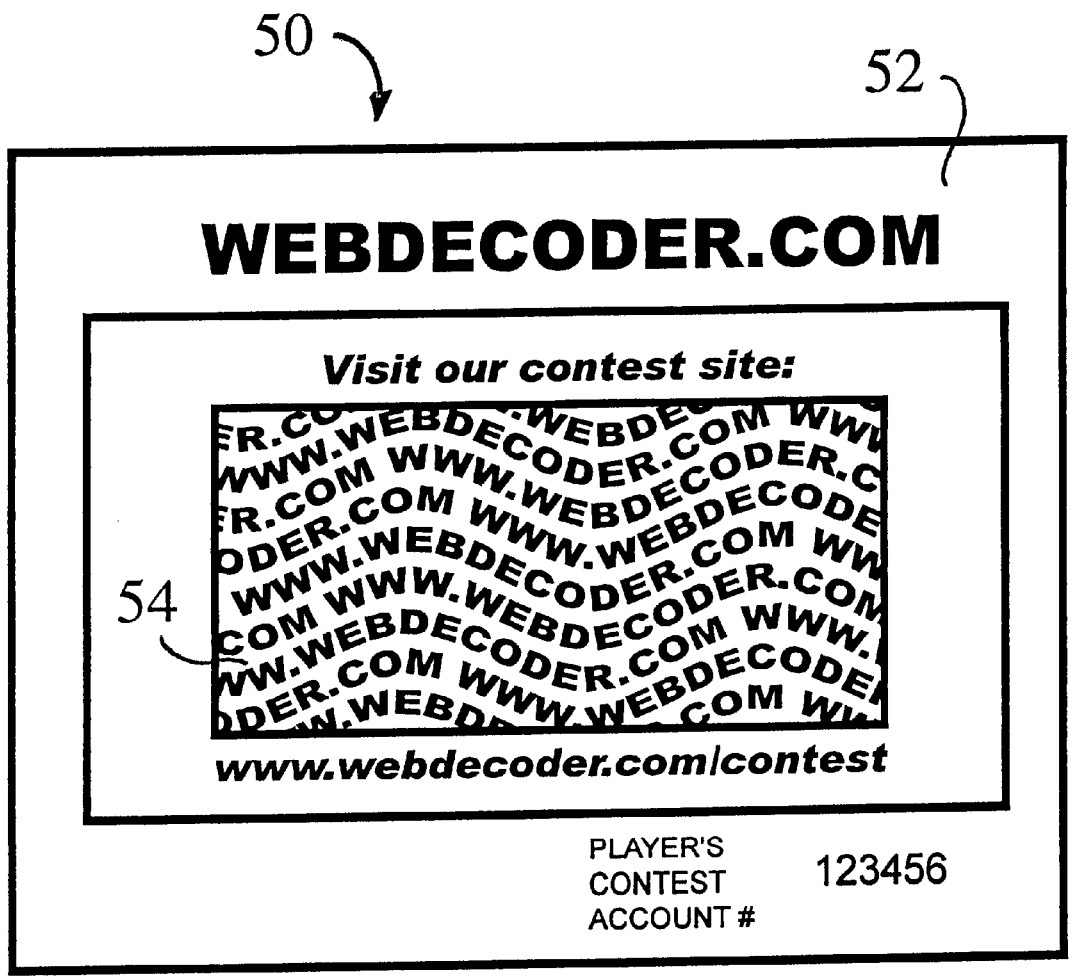
FIG. 6 is a plan view of a second embodiment of the present invention, which may be produced either as a physical game piece or as an electronic game piece.

FIG. 4 shows a user 26 holding a game piece 10 up to a portion of a screen 28 of a monitor 30 which acts as a source of revealing light of the correct color (frequency). In accordance with the preferred embodiment of the invention, the revealing light emitted from the screen is blue additive light, and (at least a portion of) the screen 28 acts as a source of the revealing light. Consequently, when the user 26 holds the game piece 10 up to the portion of the screen 28 which provides the revealing light, typically as a blue rectangle, the concealed image 22 on the game piece 10 is revealed. As shown, a typical manner of obtaining the additive blue light needed to reveal the hidden image 22 on the game piece 10 is to place the game piece 10 on a blue area of the screen 28 of an operating computer monitor 30, thereby revealing the concealed image 22.

While the concealed image 22 is visible when the game piece 10 is held up to the blue portion of the screen 28, as shown in FIGS. 2 and 4, only the concealing image 20 is visible when the same game piece 10 is not exposed to a blue additive-light source (See, FIG. 1).

With continued reference to FIG. 4, the computer monitor 30 is typically connected to a microcomputer 32, which typically has a keyboard 33 and mouse 36. The microcomputer 32 is preferably connected to a network 34, such as the Internet. This connection can be made in any number of ways, but is typically done using a modem over a telephone line, a direct network connection, a cable modem, or by a special purpose phone modem such as a digital subscriber line ("DSL") modem. Other network connections can be used, though, without departing from the spirit or scope of the present invention. Thus, when connected to the Internet, for example, the computer 32 may be running a "browser", such as Netscape or Microsoft Internet Explorer, and the browser may be directed to a URL, often called a "web site", such as the one printed on the game piece 10, as shown in FIG. 1. When at that web site, the user 26 can hold the game piece 10 up to a specific area on the screen 29 of a computer monitor 30, as shown, in order to decode the hidden image on the game piece 10.

With reference now to FIG. 5, a block diagram 36 illustrates the method of manufacturing the game piece 10 of the first embodiment of the present invention. In particular, block 38 illustrates the first step in manufacturing the game piece 10 which is to print the concealed image 22 on the substrate 12. In this step 38, the concealed image 22 is created by process printing colored ink dots on a transparent or translucent substrate 12. For best results, the concealed image 22 should be applied at 120–140 density, using high density fluorescent yellow ink.

Next, as illustrated in block 40, the second step in manufacturing the game piece 10 involves process printing the concealing image 20 over the surface of the concealed image 22. At a minimum, the concealing image 20 should be applied as a second layer in the area of the concealed image 22. However, the concealing image 20 is preferably applied over as much of the surface of the game piece 10 as desired. In printing the concealing image 20, colored ink dots of a different color than the ink dots which were used to create the concealed image 22 are used. Preferably, the concealing image 20 is printed using an ink which is of approximately the same color as the additive light source which will be used to reveal the concealed image 22. As will be obvious to one of ordinary skill in the art, if the game piece 10 is to be printed on a transparent or translucent substrate, the ink used should not be an opaque ink, as that would prevent additive light from passing therethrough. Thus, in a preferred embodiment of the invention the concealing image 20 is printed using high density fluorescent cyan ink applied at 140–150 density. In addition, it may be desirable during this step 40 to apply any other printed matter (i.e., other than the concealed image 22 and concealing image 20) which is to appear on the game piece 10. This other indicia 14 (See FIGS. 1 and 2) can be printed in any desired color or colors.

As illustrated in block 42, the third step in manufacturing the game piece 10 is the application of a dull coating 24 to the game piece 10. While it is not strictly necessary to employ this step 42, the application of the dull coating 24, helps to produce results which are superior to those obtained if the dull coating 24 is not used, as the dull coating 24 makes the hidden, concealed image 22 of the game piece 10 virtually undetectable until the game piece 10 is exposed to additive light of the correct color for activation. For best results, an aqueous dull coating 24 should be used.

Finally, block 44 contains the fourth step in manufacturing the game piece, which involves allowing the printed substrate to cure for a sufficient time, which is dependent upon the substrate, the ink, and the ambient temperature and humidity. However, 72 hours is generally a sufficient time.

While the game piece 10 of the first preferred embodiment has been described, other embodiments of the present invention have been found to provide desirable results which cannot be obtained using the game piece 10. Also, other methods of manufacturing alternative "game pieces" have been developed. Thus, with reference now to FIGS. 6–14, the design of, and a detailed description of the method of making another embodiment of a game piece 50, in accordance with the present invention, is described. The description of making the game piece 50 which follows is based upon the use of computer software to perform the layout and production of the game piece 50. In the preferred method, a programmed microcomputer, such as a PC (e.g., an "IBM compatible") or a MAC (e.g., an "Apple Macintosh" compatible) uses software, such as Adobe Illustrator and/or Adobe Photoshop to produce images which make up "layers" containing the concealing and concealed images. These layers are combined to produce the game piece 50. As will be further explained hereinafter, the game piece 50 may be produced and printed on a substrate 52, which may be either transparent, translucent, or opaque. Thus, the game piece 50 may be printed on plastic material, on paper, on cloth, or on other materials (e.g., advertising materials, mugs, or other promotional items). Alternatively, the "game piece" 50 may exist solely as a computer generated file, in a suitable format such as an Adobe Illustrator file (e.g., an ".ai", or ".eps" file), an Adobe Photoshop file (e.g., a ".psd" file), an Adobe Acrobat file (e.g., a ".pdf" file), or some other graphics file (e.g., a ".jpg" file, a ".bmp" file, or a ".tif" file) in which case it may be included in a web page (an "HTML" file) to be "distributed" over a network, such as the Internet, or on a diskette or CD-ROM, without departing from the present invention. The description which follows describes specific steps which are carried out on a computer using Adobe Illustrator and/or Adobe Photoshop, both of which are produced and distributed by Adobe Systems Incorporated, 345 Park Avenue, San Jose, Calif. 9510-2704. While Adobe Illustrator and Adobe Photoshop are used in the preferred method of preparing electronic game pieces, other software could be used without departing from the present invention.

Starting with Adobe Illustrator, one begins to produce the game piece 50 by creating a new document. In the new document, it is desirable to set the resolution to be about 2540 dots per inch ("dpi") in order to permit printing at very high resolution. Once a new document has been opened, one first creates a wavy line, such as wavy line 60, shown in FIG. 7. The wavy line 60 is a Bézier path, having endpoints 62, 64. While Bézier paths are produced in Adobe Illustrator, other wavy line paths, such as sine waves, could be used, as the only significance of the wavy line path is that it will be used as a baseline for producing concealing text which undulates, so as to have an appearance which is ultimately quite effective at hiding the hidden text.

By selecting the end point 62 of the wavy line 60 using the Reflect (Mirror) Tool and then copying the wavy line 60 about a vertical axis, the wavy line 60 is replicated as a mirror image adjacent to the original wavy line 60. The end point 64 of the original wavy line 60, and the adjacent end point of the replicated version of the wavy line (not shown) are joined using a smooth join, so as to make a single new wavy line which is twice the length of the original wavy line 60. In the preferred embodiment of making the game piece 50, this process is repeated a number of times so as to obtain an elongated, undulating wavy line 70, as shown in FIG. 8. The purpose of producing the elongated, undulating wavy line 70 is to use it as the "baseline" path for the concealing image, which is typically a typed name, phrase, URL, or other advertising indicia, as shown at 54 in FIG. 6.

Using the Path Type Tool, the text which will be used to produce the concealing image 54 is next entered on the elongated, undulating wavy line 70, thereby producing a line of wavy text 72, as shown in FIG. 9. Those familiar with Adobe Illustrator will recognize that the elongated, undulating wavy line 70 does not appear in the ultimate image 54, but that it is used as the "baseline" for text to be entered on the elongated wavy line 70. Thus, while the elongated, undulating wavy line 70 is visible when producing the Illustrator artwork, it is not visible on the printout when the artwork is printed, as shown in FIGS. 6 and 9–11.

Figure 10:
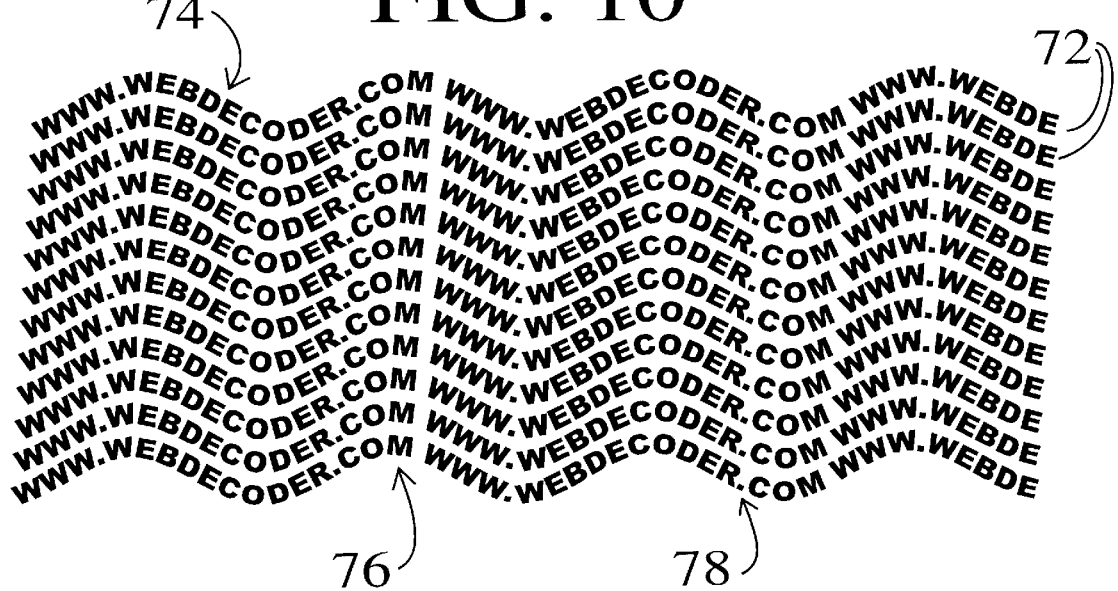

Referring next to FIG. 10, the line of wavy text 72 (FIG. 9) is duplicated a number of times to produce an image 74 comprised of multiple copies of the line of wavy text 72. As the purpose of the concealing image 54 (See FIG. 6) is to obfuscate the concealed image on the game piece 50, it has been found that it is best to avoid having repeated, identical lines of wavy text 72, as that produces flowing "rivers" of white space 76, or flowing white space areas 78 with minimal text (e.g., lines of periods, as shown) through which any discontinuity, such as the concealed text image, would be relatively easy to perceive.

Figure 11:
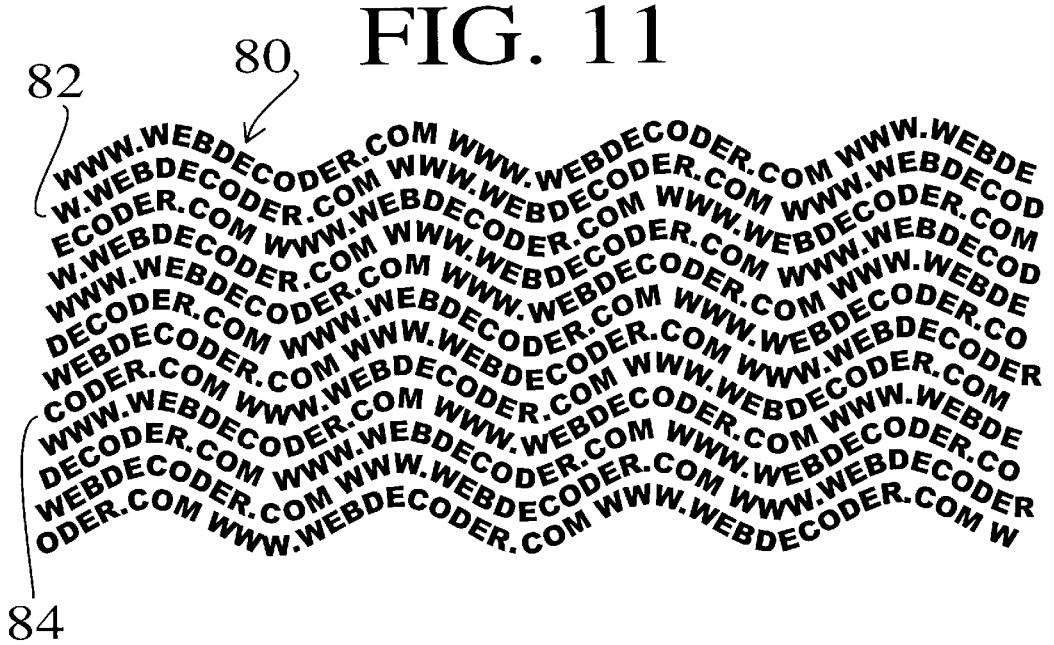

Accordingly, the next step in the preferred embodiment of the invention, is illustrated in FIG. 11 in which each line of text is preferably modified by adding and/or deleting characters, or otherwise offsetting the text, such that adjacent lines are not identical, thereby producing an offset wavy text pattern 80, in which adjacent lines, i.e., lines 82, 84 are offset, such that the white space "rivers" 76, and the other flowing white space areas 78 (See, FIG. 10) are substantially eliminated. Thus, the offset wavy text pattern 80 of FIG. 11, appears to be far less uniform than the repeated wavy text pattern 74 of FIG. 10. As will be recognized by those skilled in the art, this offsetting of the concealing text further serves to provide a concealing image 54 (FIG. 6) which will obfuscate a hidden image.

Figures 12, 13:
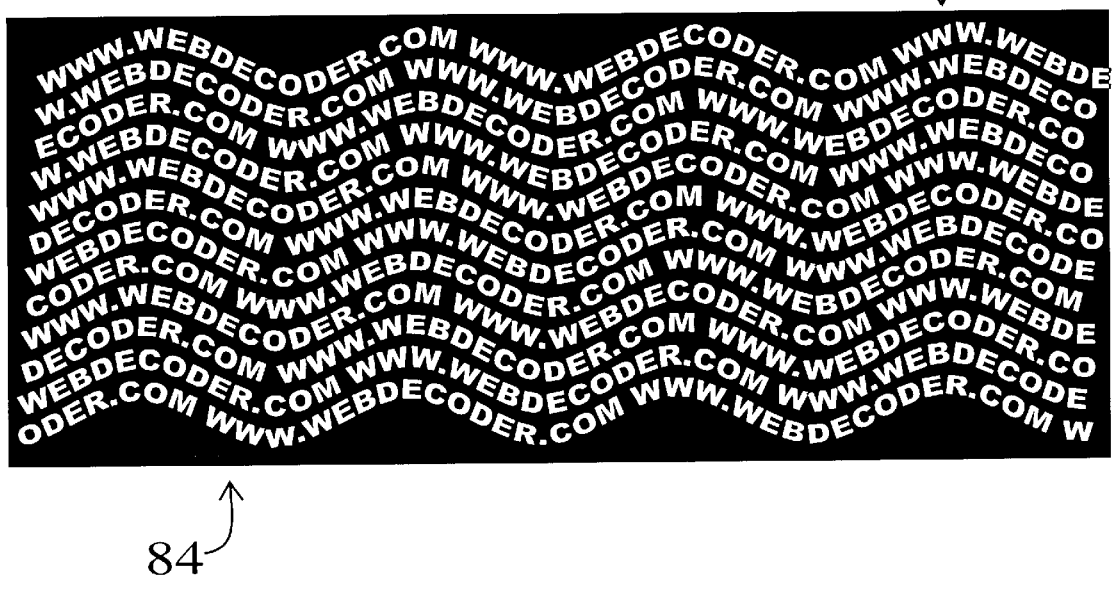

Once the offset wavy text pattern 80 has been produced, it is used to create one or more concealing image masks, such as the mask 82 shown in FIG. 12. To create the mask 82 using Adobe Illustrator, one starts with the offset wavy text pattern 80 of FIG. 11. Then, using the Rectangle Tool, a rectangular box 84 is drawn around the wavy text pattern 80. The rectangular box 84 is sent to the back of the image, and it is hidden. Next, the text, which has been formed using a suitable font, is converted into outlines. It has been found that to be desirable to use a font, such as Arial Black, or other relatively wide (or bold) san serif font to produce the concealing text. Thus, in the preferred embodiment, Arial Black, 12 pt. font is used.

The text in the wavy text pattern 80 must be converted to "outlines" so that it can be integrated into the mask 82. Accordingly, the next step in the inventive method involves releasing the compound paths, selecting all of the objects, and then making compound paths. This step is used, because a mask must be a single "shape" defined by a compound path. Finally, the Select Tool is clicked outside of the box 84 to yield the mask 82, as shown in FIG. 12. While color has not been a factor thus far in the development of the mask 82, which is typically produced in black with white "text" (actually the paths defining the text, as the text no longer exists once it has been converted into a compound path), it is now necessary to invoke the color selection process to produce at least one mask, but preferably two masks, which can be saved as computer files, preferably in a format which can be imported into Adobe Photoshop.

In the preferred embodiment of the invention, the first mask, called the lower mask, is colored yellow (where the mask 82 is black) by selecting the image 82 and then adjusting the color palette to all yellow (setting yellow's value to 100) with no cyan, magenta, or black (setting these values to 0). This mask, called the "Yellow Mask", should be saved in a suitable format (e.g., as an ".eps" file). After saving the Yellow Mask, the color palette can be adjusted to provide a cyan image (by changing the value of cyan to 100 and the value of yellow to 0, with the black and magenta already set to 0), and the second, or upper mask, which may be called the "Cyan Mask" is saved, again, preferably as an ".eps" file.

Having created both the Yellow and Cyan Masks, which will be used to conceal the hidden image, it is now necessary to create the hidden text image. Referring to FIG. 13, the concealed or hidden text 90 can be simply typed onto a blank document in a suitable font. It has been found to be beneficial to use a relatively large serif font, such as a 36 pt. Times font, and to form it in an outlined stroke 92 with a white interior 94, with the stroke 92 having the same color as the lower mask, i.e., yellow in the preferred embodiment of the invention. Thus, in the preferred embodiment of the invention, the hidden text image 90 is formed using a yellow stroke 92, having a thickness of between about 1 pts and 4 pts, and a white fill 94, as shown. After completing the hidden text image 90, it, too, is saved, preferably as an ".eps" file.

Having created three separate files—one each for the Yellow Mask, the Cyan Mask, and the Hidden Text, it is time to assemble them into a single image. While the assembly can be accomplished in Adobe Illustrator (in which case all of the foregoing could be accomplished in a single document without intermediate file saving), in the preferred method, the assembly is accomplished using Adobe Photoshop, as there are several functions available in Adobe Photoshop (e.g., filters, and color modifications) which make it easy to create unique patterns, colors, and/or formats.

After starting Adobe Photoshop, the Yellow Mask, Cyan Mask, and Hidden Text images are loaded, and a new file is created. The Yellow Mask is selected, copied, and pasted into the new file (alternatively, of course, the Yellow Mask file could be used as the "new" file, and it could simply be renamed, so as to preserve the original file's integrity, as it may be needed again). At this point, the first layer of the new image has been placed into the new file, where it is identified as Layer 1 (using Adobe Photoshop nomenclature). Next, the Hidden Text image is selected, copied, and pasted into the new file, where it becomes Layer 2. Finally, the Cyan Mask is selected, copied, and pasted into the new file, where it becomes Layer 3.

At this point, Adobe Photoshop will have a single file with Layers 1, 2, and 3 overlaying each other. In order to help hide the Hidden Image (Layer 2), Layer 3 should be offset vertically and horizontally somewhat from Layer 1. This step is readily accomplished using the Move Tool to move either Layer 1 or Layer 3. Usually, an offset of about one-half a character horizontally, and about one-half a line vertically is sufficient. In addition, or alternatively, Layers 1 and/or 3 can be "distorted", such as by using the "spherize" filter and/or the "twirl" filters. Note, that Layer 2, which contains the hidden text should not be distorted in any manner which will adversely affect one's ability to read the hidden text. Layer 3 should be placed in "multiply" mode, whereby the overall image will appear green from the blending of the cyan in Layer 3 with the yellow in Layers 1 and 2.

At this point, the image thus formed can be cropped, so as to eliminate the yellow and cyan edges which appeared when Layers 1 and 3 were offset. The Photoshop image should now be saved in Photoshop (".psd") format to preserve the layers in the event that additional game pieces, with different hidden messages (i.e., different Layer 2's) are to be produced with the same Layers 1 and 3. Then, depending upon the ultimate use for the game piece 50, the present invention provides for a number of options and uses for the game piece 50.

Figure 14:
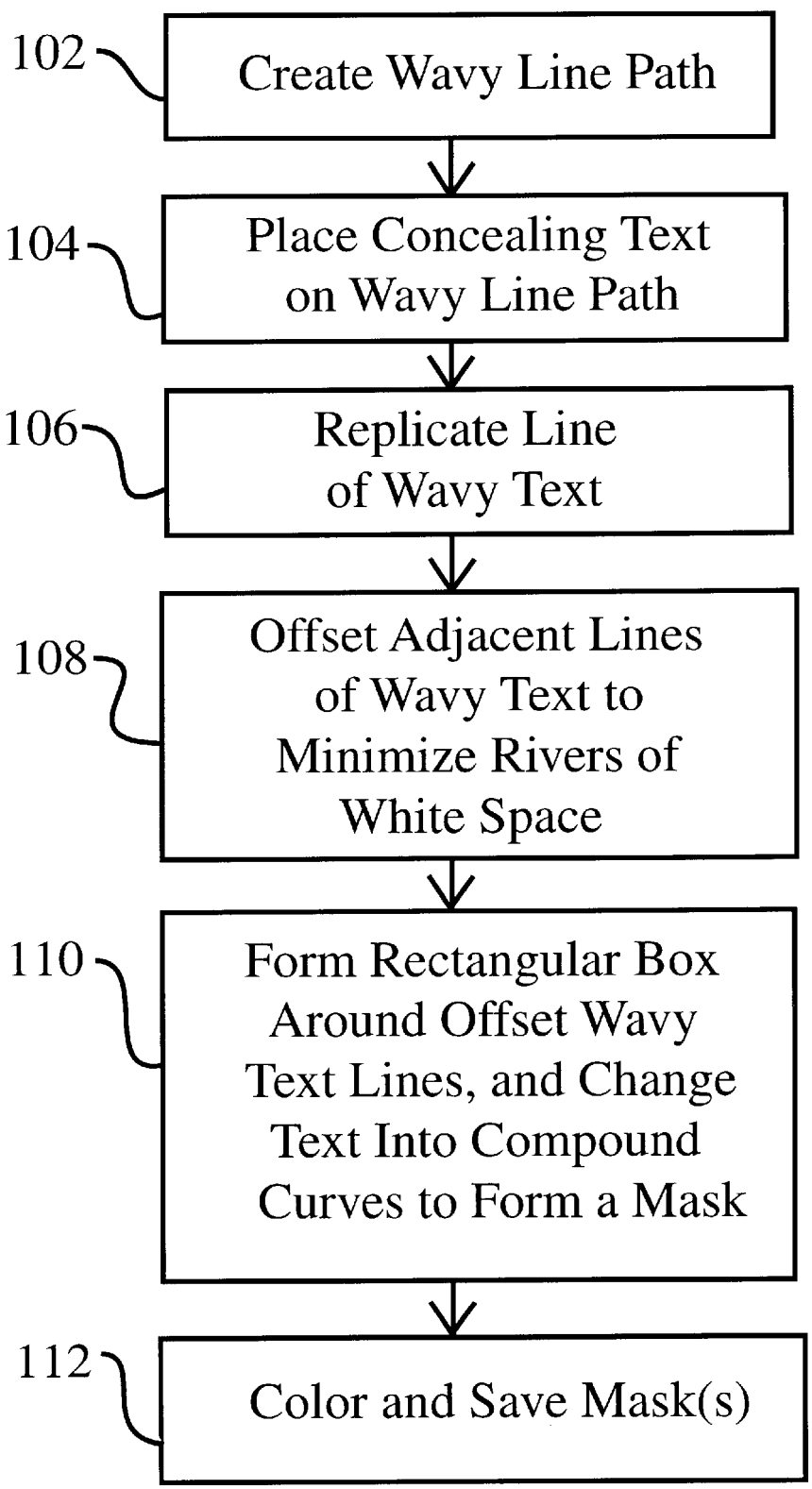
FIG. 14–16 are flowcharts illustrating the steps used in the production of the game piece of FIG. 6.
Figure 15:
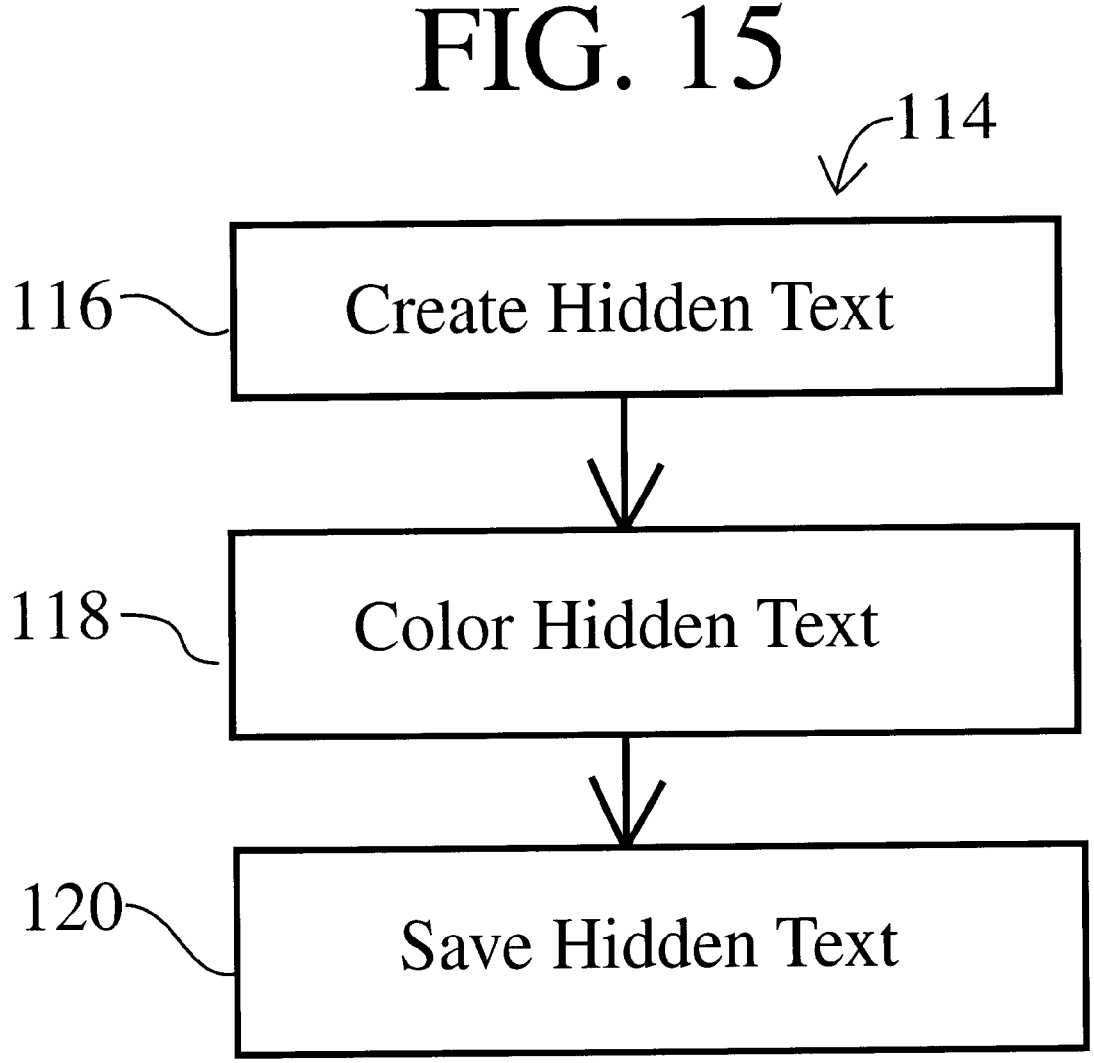
Figure 16:
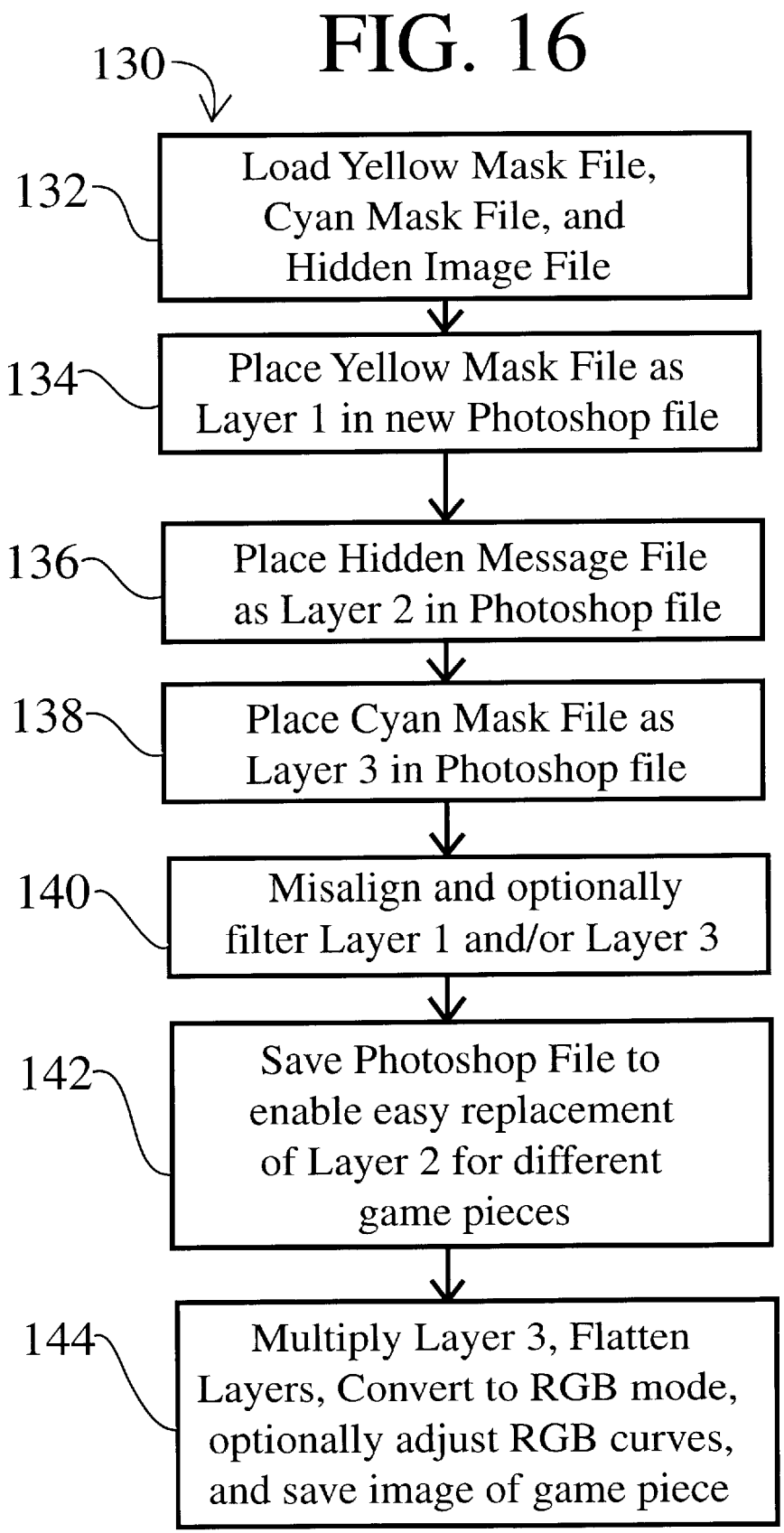

Referring now to FIGS. 14–16, the method of making the game piece 50 of the present invention is explained. First, with reference to FIG. 14, a flow chart 100 sets forth the steps used to create mask image 82 (FIG. 12). The first step 102 is to create a wavy line path (See, elongated wavy line path 70, FIG. 8). In the next step 104, the concealing text is placed on the wavy line path (See, wavy text 72, FIG. 9). The line of wavy text is then replicated 106 to form adjacent, identical lines of wavy text (See, 74 in FIG. 10). Then, the text in the adjacent lines is offset 110 (See, 80 in FIG. 11), and a mask (See, 82 in FIG. 12) is produced 110. Copies of the mask are then colored and saved 112.

Referring to FIG. 15, the process of creating the image of the hidden text 90 (FIG. 13) is shown in flow chart 114. This process involves the steps of creating the hidden text message 116, coloring the hidden text 118, and saving the hidden text file 120.

The process of using the mask and hidden image files to create an electronic game piece is described in the flow chart 130 shown in FIG. 16, in which the first step 132 is to load the mask and hidden image files into Adobe Photoshop. Next, as shown in block 134, the Yellow Mask is placed as Layer 1 in a file. Then, as shown in block 136, the hidden message file is placed into the file, as Layer 2. In the following step 138, the Cyan Mask is placed into the file as Layer 3. In the following step 140, Layers 1 and 3 are misaligned, and either, or both, of them can be optionally filtered (e.g., spherized and/or twirled). At this point the Photoshop (".psd") file should be saved, so that it may be recalled as a three layer Photoshop (".psd") file thereby enabling easy replacement of Layer 2 (the Hidden Message layer) for different game pieces in the same game. This way several game pieces can be made to appear virtually identical, even though they have different hidden text messages. Finally, in step 144, the mode of Layer 3 (the cyan layer) is changed to "multiply", the layers are "flattened", the color mode is changed to RGB, and the file is saved in a suitable format (e.g., as a ".jpg" file) for electronic distribution and/or printing. Optionally, in this step 144 the RGB curves can be adjusted to give the image a magenta (rather than green) appearance in order to enhance the effect produced.

To make a game piece 50 substantially equivalent to the game piece 10, the additional indicia 14, including the URL 16 and serial number 18, can be added, the electronic game piece 50 can be sized, and it can then be printed on paper or a suitable transparent or translucent substrate. It can even be printed on a transferable substrate for application to cloth (e.g., a T-shirt transfer) or to a mug, for example. If printed on a polyethylene substrate 52, the main difference between the present embodiment of the invention and the embodiment 10 is that the present embodiment 50 includes the Yellow Layer under (or incorporated with) the Hidden Text Layer, in addition to the Cyan Layer above the Hidden Text layer. It would still be desirable, of course, to provide a "dull finish" layer as an overcoat.

The present embodiment 50 of the invention, provides several new areas for exploiting game pieces of the type described. In particular, the game piece 50 can be made to exist solely as an electronic image. In that regard, additional manipulation in Photoshop can provide a unique file, having capabilities not available with the game piece 10. In particular, the three layers of the Photoshop image can be "flattened", the mode of the image can be changed into RGB mode, and the flattened image can be sized and saved as a "jpg" file. The RGB ".jpg" file can then be displayed directly on a computer monitor, as part of a piece of software, or as an image served up by a web server. Thus, instead of having to distribute unique game pieces, as is necessary with the game piece 10, instead, electronically produced unique game pieces 50 (differing from one another by their hidden text message, for example) can be served up at a web site at different times, such that a large prize "winner" will only be exposed (served) for a limited amount of time, while other prizes, and non-winners can be exposed at other times. Since the hidden message on the electronic game piece 50 can be changed and displayed on Internet web sites, as desired, it is even possible to use the game piece 50 as the basis for sending coded messages over the Internet, or via e-mail. In that regard, it may be desirable to have the top layer be patterned, rather than all cyan. For example, if the top layer is formed in stripes of cyan and magenta, a the decoder piece, corresponding to a filter having cyan and magenta stripes would be used to decode the image.

In order to view the hidden image on the electronic game piece 50 of the present embodiment of the invention, a user would hold up a colored filter, which could be distributed for use with multiple games. Such a filter could be in the form of a colored plastic sheet (See, FIG. 18), or a pair of eyeglasses (See, FIG. 19) having colored plastic lenses. In the preferred embodiment of the game piece 50, the plastic sheet or the lenses in the eyeglasses would be blue (cyan).

In converting images to RGB format in Photoshop, it has been discovered that a very effective result can be obtained by reversing the image curve for the RGB channel (using the menu selections Image|Adjust|Curve), so that the input is switched from 255 to 0, while the output is switched from 0 to 255. This adjustment of the RGB curve provides an electronic image which looks like magenta over blue, and which is very effective at further obfuscating the hidden image.

While the preferred method of making the present invention has been described in detail, other variations can be employed without departing from the spirit or scope of the invention. Thus, it may be desirable to include a logo on the game piece, and this can readily be accomplished by setting the logo in cyan with a white outline, and placing it on top of the normal wavy pattern in the cyan layer. Then, above the yellow layer, the hidden copy can be set in a san-serif format in yellow with a very wide white outline (preferably on the order of from about 8 to 12 points), and the hidden image would be set just under where the logo placement would be. In this format, it has been found that the hidden copy should not be formed in type more than 14 points high. No changes to the bottom layer will be needed.

While the hidden image game piece of the preferred embodiment of the invention, along with the manner in which it is made have now been fully described, it has been found that other variations of the present invention can be made. In particular, in the preferred embodiment thus far described, the game piece is formed with both a hidden image and a concealing image, and the revealing light source (which is blue light in the preferred embodiment of the invention) is generated on the screen of a computer monitor. It has been found that hidden image game pieces thus formed in accordance with the preferred embodiment of the invention are an ideal way to drive recipients of such game pieces to a web site on the Internet, as the game pieces may include indicia about contests, discounts, or other items of interest to a recipient. As the recipient will not know whether the game piece which they receive (e.g., in a mailing, in a box or other container containing goods, in an advertising piece, etc.) is a "winner" until subjected to the revealing light source, they are induced to go to the provider's web site to hold the game piece up to a specified location on a specified web page. In order to gain access to the specified web page, it may first be necessary for the recipient to enter demographic information on one or more preceding web pages, or they may subjected to advertising by the operator of the web page. Thus, one application of the game piece is to provide a basis for driving recipients to a web page hosted by the game piece supplier.

As the revealing light source which is generated on the computer monitor is only a source of additive light having the correct color, an alternative method of using the game piece 50 is to have the recipient come to a retail outlet operated by the game piece provider to check out whether or not they hold a "winning" game piece which could be good for discounts in the store, or other prizes. This can be accomplished in a number of ways. For example, a retail store can have a computer set up, and holders of game pieces can be asked to enter demographic information prior to a revealing light source being made available on the computer monitor. In this embodiment, it is not necessary for game piece recipients to have access to the Internet, or to even own a computer. Alternatively, a simple computer monitor-like display can be in the store, and it need only have a source of revealing light displayed thereon, and no computer or computer monitor need be available in the store.

While a number of ways to use the game piece heretofore described have been set forth, it has been discovered that the image formed on the game piece 50, and printed on the substrate can also be produced in the form of a computer generated image which can be displayed on a computer monitor or printed on an opaque substrate, such as a piece of paper, or on a post card, a box or other container, or otherwise made available for distribution. If the hidden image game piece 50 thus formed is displayed on a computer monitor, for example, a user can receive a game piece (See game piece 160, FIG. 18) which contains a filter of the correct color, on a piece of plastic. Alternatively, the user can receive of a pair of eyeglasses containing lenses of the correct color (See FIG. 19). In this embodiment of the invention, it is not necessary for the recipient to receive multiple game pieces to play a number of times, as new images can be periodically placed on a web site, and the player (i.e., the recipient of the revealing game piece or eyeglasses) can repeatedly revisit the web site to see if a winning image is being displayed at the time when they "visit". Advantages of this latter embodiment are that the task of distribution of a game decoding piece need occur only once, yet the recipient is induced to repeatedly visit the game site in order to check on whether they have "won" a prize. Thus, if the game piece 50 is being used in connection with an advertising promotion, it is possible to distribute a single game decoding piece once, while inducing the recipient to "play" a number different games, or the same game a number of different times.

Figure 17:
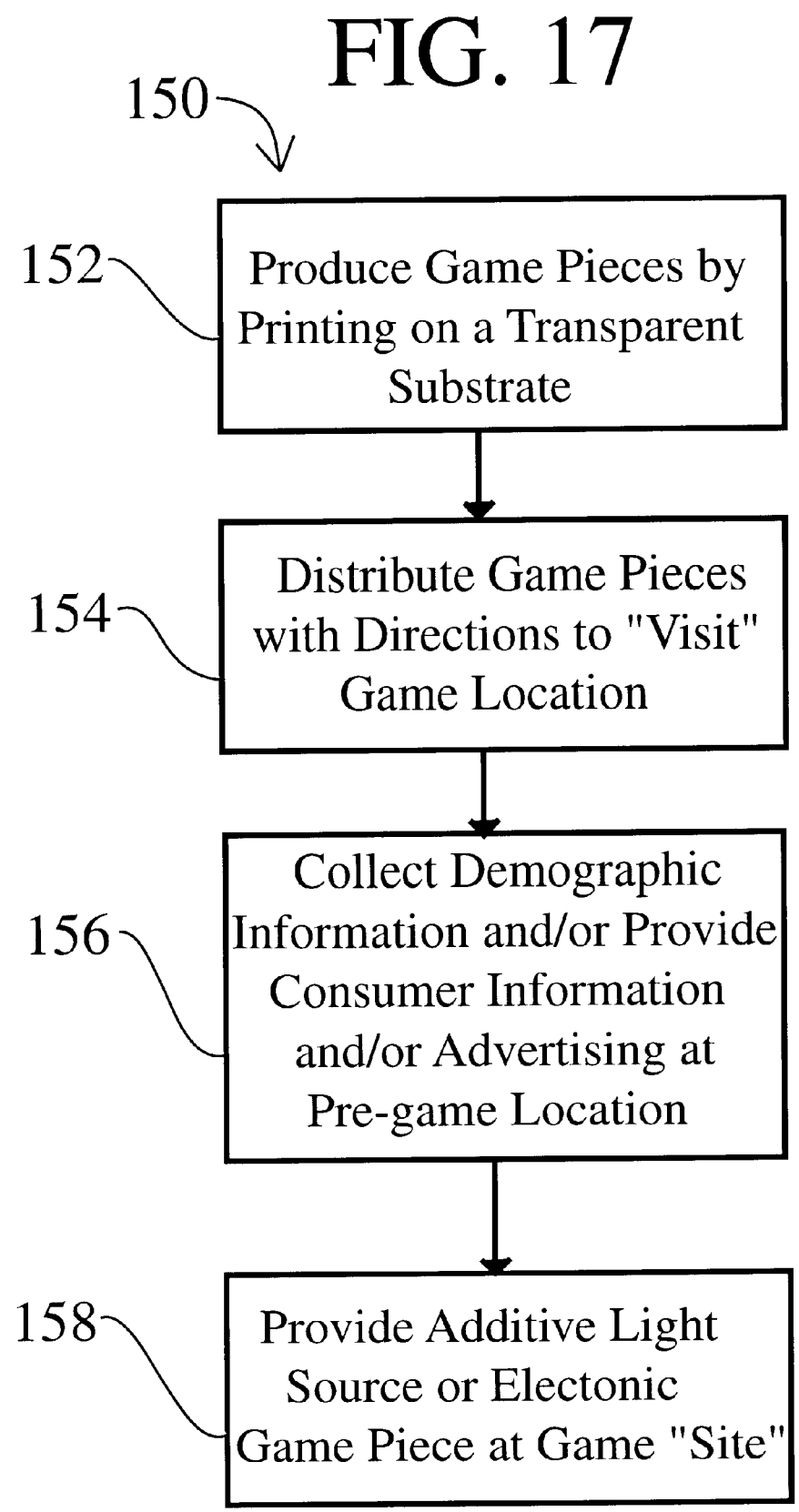
FIG. 17 is a flowchart illustrating an inventive method of using the game piece of FIG. 6.

The present game pieces 10, 50 provide for numerous of business opportunities which can be exploited over a network, such as the Internet. In particular, a first such business opportunity can be expressed as a business model involving the steps 152, 154, 156, 158 illustrated in the flowchart 150 shown in FIG. 17. In this business model, the first step 152 involves producing game pieces by printing them on a transparent substrate. The game pieces 10, 50 can be produced by any of the methods heretofore described, and the game pieces 10, 50 may include a hidden message, as do the game pieces 10, 50, or they may simply be colored filters (See, FIG. 18) or eyeglasses (See FIG. 19) for use with a computer generated electronic game piece 50, as described above. In the next step 154, the game pieces are distributed with directions to "visit" a game site. As described above, a game site can be an Internet web site ("address" or "URL") on the World Wide Web, or it may be a physical location, such as a retail outlet. The user, having the game piece will then "go to" the game site. When the user "goes to" a physical game site, such as a retail outlet, they will be in a position where the game piece provider is able to collect demographic information from the user, offer a credit card to the user, show the user products available for sale, or simply have the user pass through the retail outlet, prior to allowing the user to "play" by availing the user of a source of additive light. As described above, the source of additive light could be provided by a computer monitor attached to a computer programmed to obtain the demographic information from the user. Alternatively, the source of additive light could be a computer monitor "mock up" which simply provides, for example, a screen having a blue rectangular area.

Alternatively, the step 156 could be an information gathering form on a page of a web site, into which a user must insert demographic information, or some advertising or promotional screen at a web site, which a user must go to prior to being able to press a "button" which ultimately takes the user to the actual game site page where the source of additive light is provided.

Figure 18:
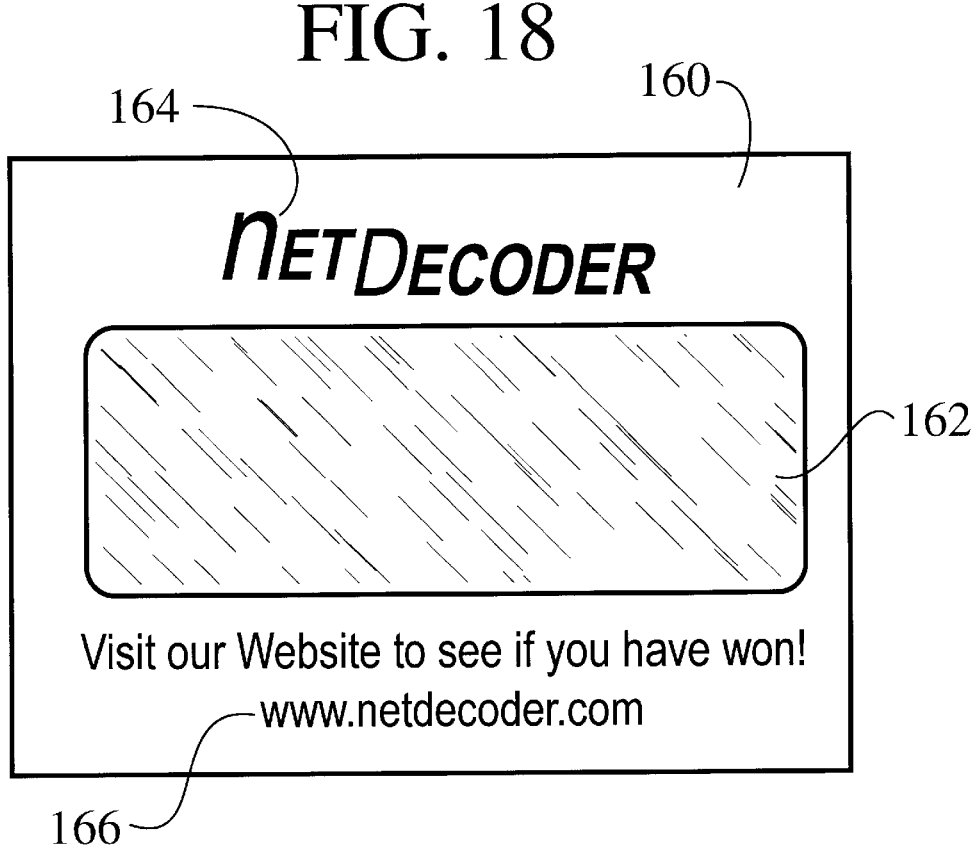
FIG. 18 is a plan view of a game piece which contains a filter used to view an electronically produced game piece made in accordance with the second embodiment of the present invention.
Figure 19:
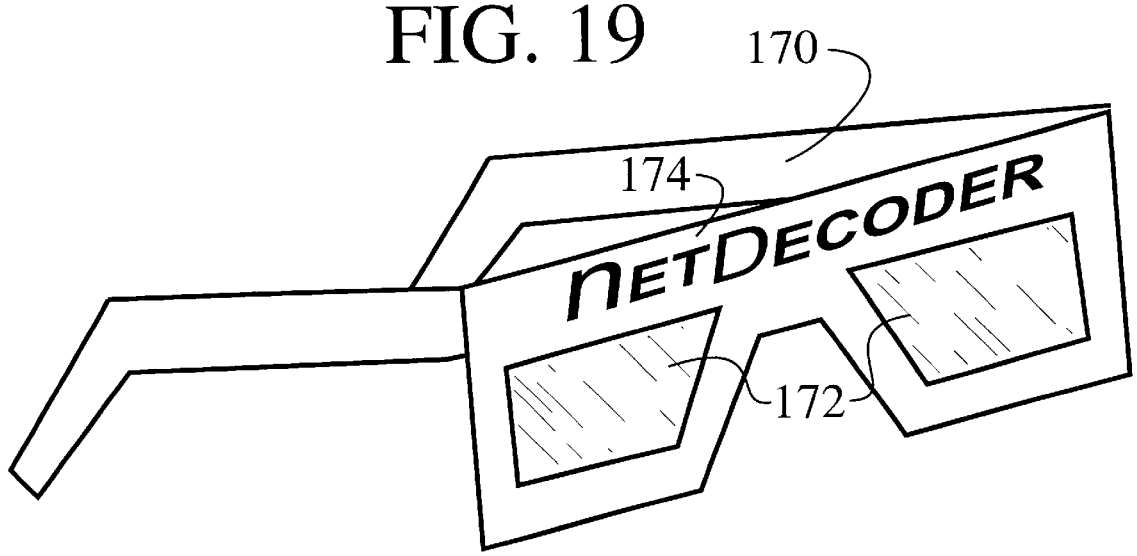
FIG. 19 is a perspective view of a pair of eyeglasses containing filter lenses which may be used to view an electronically produced game piece made in accordance with the second embodiment of the present invention.

As a further alternative to the foregoing method of providing advertising and/or obtaining demographic information from a user, the game piece 160 provided to the user can contain a filter 162 which may be a colored area of the game piece 160, as shown in FIG. 18. The game piece 160 can also contain other advertising 164 and address indicia 166. Alternatively, it could be in the form of a pair of "eyeglasses", which may be simply plastic or cardboard frames 170 having suitable filters 172 for lenses, and which may contain advertising 174 thereon, as shown in FIG. 19.

Yet another business model made available by the game piece of the present invention involves the creation of the game pieces themselves. Thus, an Internet web site can be established which contains a number of templates for game pieces, such as the game pieces 50 of FIG. 6 or the game piece 160 of FIG. 18. At the web site a user could be asked to "fill in" a selected template with appropriate advertising indicia and/or enter one or more "hidden messages", and the text for the concealing image (See 54, FIG. 6). The user could then be asked to provide ordering information to have game pieces provided (either by remote printing and production) or in an electronic file format (such as one or more ".jpg" files). Payment could be solicited from the user via credit card, or other form of billing, and delivery could be accomplished either physically, or electronically (e-mail, etc.).

The steps set forth above, are illustrated in the flowchart 180 of FIG. 20 wherein the first step 182 is to create at least one template for producing electronic game pieces. The template could be similar to the game piece 50 shown in FIG. 6, except that "fill-in fields" would be shown, instead of the information of a specific user. The next step 182 is to make the template(s) available at a particular web site on the Internet. A user who "goes to" the web site will be presented with a form or other method of filling in the fields with their own unique hidden message, their own concealing message, and, optionally, such other indicia (e.g., advertising, logos, their own art work which could be uploaded, etc.) for inclusion into a game piece to be produced, as shown in step 184. Once a user has selected a template, and provided the appropriate information (or uploaded images, such as a ".jpg" file with photos, logos, etc.), an electronic file is produced corresponding to the filled-in template and user provided information and/or data, as shown at step 186. The user is then presented with a form, whereby the user can provide delivery and payment (e.g., credit card) information, as shown at step 188. Finally, the game piece which is produced, either automatically or manually, is "delivered" to the user, either in physical or electronic form (or both), as represented by step 190.

Although the description above contains many specificities, these should not be construed as limiting the scope of the invention but as merely providing illustrations of some of the presently preferred embodiments of this invention. The scope of the invention should be determined by the appended claims and their legal equivalents, rather than by the examples given.

What is claimed is:

1. A game piece with a hidden image comprising:
   (a) a first visible layer comprising an image formed in a first color, said first layer being formed in a manner which will assist in obfuscating an image to be hidden;
   (b) a second visible layer containing an image to be hidden, said second layer being formed in said first color;
   (c) a third visible layer comprising an image formed in a second color, said second color being distinct from said first color, said third layer being formed in a manner which will assist in obfuscating said image to be hidden which is on said second layer.

2. The game piece of claim 1 wherein said image on said first layer is comprised of text.

3. The game piece of claim 1 wherein said hidden image game piece is formed as an electronic image.

4. The game piece of claim 2 wherein said image on said third layer is comprised of text.

5. The game piece of claim 4 wherein said image on said first layer and said image on said third layer are comprised of the same text.

6. The game piece of claim 5 wherein said first color is selected from the group consisting of cyan, yellow, and magenta, and said second color is selected from said group consisting of cyan, yellow, and magenta.

7. The game piece of claim 5 wherein said text is formed in lines.

8. The game piece of claim 6 wherein said first color is yellow and said second color is cyan.

9. The game piece of claim 7 wherein said text is formed in wavy lines.

10. The game piece of claim 9 wherein said wavy lines of text on said first layer are displaced, whereby columns of white space are minimized.

11. The game piece of claim 10 wherein said wavy lines of text on said third layer are displaced, whereby columns of white space are minimized.

12. The game piece of claim 11 wherein said image on said first layer is filtered.

13. The game piece of claim 11 wherein said image on said third layer is filtered.

14. The game piece of claim 11 wherein said first layer and said third layer are identical but offset from one another.

15. The game piece of claim 13 wherein said hidden image on said second layer is text.

16. The game piece of claim 15 wherein said text on said first layer is formed in a san serif font.

17. The game piece of claim 16 wherein said text on said second layer is formed in a serif font.

18. The game piece of claim 17 wherein said font used on said hidden text is larger in point size than said font used on said text in said first layer.

19. The game piece of claim 18 wherein said font used on said hidden text is formed in outline with a transparent interior.

20. The game piece of claim 14 wherein said offset is approximately one-half character horizontally.

21. The game piece of claim 20 wherein said offset is approximately one-half line vertically.

22. The game piece of claim 3 wherein said image is saved as a single layer.

23. The game piece of claim 22 wherein said image is saved in RGB mode, whereby it can be displayed on a monitor.

* * * * *